United States Patent
Suchy et al.

(10) Patent No.: US 11,520,027 B2
(45) Date of Patent: Dec. 6, 2022

(54) DEVICES, SYSTEMS AND PROCESSES FOR ULTRA-SHORT RANGE DETECTION OF OBSTACLES

(71) Applicant: SEMICONDUCTOR COMPONENTS INDUSTRIES, LLC, Phoenix, AZ (US)

(72) Inventors: Tomas Suchy, Brno (CZ); Marek Hustava, Bratislava (SK)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 118 days.

(21) Appl. No.: 16/791,085

(22) Filed: Feb. 14, 2020

(65) Prior Publication Data

US 2021/0255295 A1  Aug. 19, 2021

(51) Int. Cl.
*G01S 7/523* (2006.01)
*G01S 15/931* (2020.01)

(52) U.S. Cl.
CPC .......... *G01S 7/523* (2013.01); *G01S 15/931* (2013.01); *G01S 2015/937* (2013.01)

(58) Field of Classification Search
None
See application file for complete search history.

(56) References Cited

U.S. PATENT DOCUMENTS

| | | |
|---|---|---|
| 4,074,070 A | 2/1978 | Gaus |
| 4,122,725 A | 10/1978 | Thompson |
| 4,533,795 A | 8/1985 | Baumhauer |

(Continued)

FOREIGN PATENT DOCUMENTS

| | | |
|---|---|---|
| DE | 20120201100 A1 | 8/2013 |
| GB | 2483337 A | 3/2012 |

OTHER PUBLICATIONS

Hustava, "Detection of Noise-Induced Ultrasonic Sensor Blindness", "U.S. Appl. No. 16/254,882", filed Jan. 23, 2019.

(Continued)

*Primary Examiner* — Isam A Alsomiri
*Assistant Examiner* — Vikas Atmakuri
(74) *Attorney, Agent, or Firm* — Brake Hughes Bellermann LLP

(57) ABSTRACT

Embodiments include devices, system and processes for facilitating ultra-short range detection of obstacles using a PAS sensor. A process may include obtaining a correlation of at least two characteristics of a transducer; determining a given transmission frequency and selecting a reverberation time desired for the transducer; obtaining a damping ratio corresponding to the selected reverberation time; generating a ranging signal command; generating a damping signal command; and outputting each of the ranging signal command and the damping signal command. The ranging signal command may instruct a PAS sensor to drive the transducer to output a ranging signal at the given transmission frequency, at a transmission amplitude, and at a transmission phase and the damping signal command results in a dampening, at the damping ratio, of transducer reverberations arising from the ranging signal. The damping ratio may be between thirty percent (30%) and eighty percent (80%) of the transmission amplitude.

21 Claims, 6 Drawing Sheets

(56) References Cited

U.S. PATENT DOCUMENTS

| | | | |
|---|---|---|---|
| 4,543,577 A | 9/1985 | Tachibana | |
| 4,586,172 A | 4/1986 | Vernet | |
| 4,858,203 A | 8/1989 | Hansen | |
| 5,079,751 A | 1/1992 | Woodward | |
| 5,161,537 A | 11/1992 | Hashimoto | |
| 5,358,466 A | 10/1994 | Aida | |
| 5,724,313 A | 3/1998 | Burgess | |
| 6,731,569 B2 | 5/2004 | Yurchenko | |
| 7,408,448 B2 | 8/2008 | Li | |
| 8,154,955 B2 | 4/2012 | Yoshida | |
| 8,416,641 B2 | 4/2013 | Horsky et al. | |
| 8,699,299 B2 | 4/2014 | Horsky | |
| 10,179,346 B2 | 1/2019 | Kutej et al. | |
| 10,418,994 B1 | 9/2019 | Cullen et al. | |
| 10,966,021 B2 | 3/2021 | Koudar et al. | |
| 11,163,308 B2 | 11/2021 | Alawieh et al. | |
| 2001/0012238 A1 | 8/2001 | Iwasaki | |
| 2003/0039171 A1 | 2/2003 | Chiapetta | |
| 2003/0060094 A1* | 3/2003 | Motsenbocker | B63H 1/28 440/6 |
| 2003/0154792 A1 | 8/2003 | Katayama | |
| 2004/0090195 A1* | 5/2004 | Motsenbocker | B60L 58/33 318/109 |
| 2006/0103426 A1 | 5/2006 | Lee et al. | |
| 2008/0195284 A1 | 8/2008 | Hammadou | |
| 2009/0009306 A1 | 1/2009 | Magane et al. | |
| 2009/0135672 A1 | 5/2009 | Matsuura et al. | |
| 2009/0196428 A1 | 8/2009 | Kim | |
| 2010/0199773 A1* | 8/2010 | Zhou | G01H 9/004 73/655 |
| 2012/0154048 A1 | 6/2012 | Myles | |
| 2012/0286859 A1 | 11/2012 | Libert et al. | |
| 2014/0293746 A1* | 10/2014 | Tran | G01S 15/88 367/93 |
| 2014/0331772 A1 | 11/2014 | Klotz | |
| 2015/0063073 A1 | 3/2015 | Takahata | |
| 2015/0078130 A1 | 3/2015 | Urban | |
| 2015/0243273 A1* | 8/2015 | Wu | G10K 11/004 428/35.8 |
| 2015/0260833 A1 | 9/2015 | Schumann et al. | |
| 2016/0357187 A1 | 12/2016 | Ansari | |
| 2016/0380640 A1 | 12/2016 | Boser | |
| 2017/0074977 A1* | 3/2017 | Koudar | G01S 15/87 |
| 2017/0115382 A1* | 4/2017 | Koudar | G01S 7/524 |
| 2017/0168151 A1* | 6/2017 | Kim | G01S 7/52006 |
| 2017/0318390 A1 | 11/2017 | Bjork | |
| 2017/0363459 A1 | 12/2017 | Kim | |
| 2018/0095059 A1 | 4/2018 | McQuillen et al. | |
| 2018/0160226 A1 | 6/2018 | Hustava et al. | |
| 2019/0025415 A1 | 1/2019 | Suchy et al. | |
| 2019/0079173 A1 | 3/2019 | Kutej et al. | |
| 2019/0141443 A1* | 5/2019 | Koudar | G01S 15/10 |
| 2019/0212423 A1 | 7/2019 | Hustava et al. | |
| 2019/0337015 A1* | 11/2019 | Nakao | H04R 3/00 |
| 2019/0377074 A1 | 12/2019 | Sugae | |
| 2020/0153653 A1 | 5/2020 | Hustava et al. | |
| 2020/0200898 A1 | 6/2020 | Hustava et al. | |
| 2020/0400803 A1 | 12/2020 | Suchy et al. | |
| 2021/0220871 A1 | 7/2021 | Axman et al. | |

OTHER PUBLICATIONS

Hustava, Marek, "Piezoelectric Transducer Controller Having Model-Based Sideband Balancing", "U.S. Appl. No. 16/724,783".

China Application Serial No. 202022136114.2, Office Action, dated Apr. 30, 2021 (Machine Translation).

China Application Serial No. 202022136114.2, Response to Office Action, dated Jul. 12, 2021 (Machine Translation).

China Application Serial No. 202022136114.2, First Notification to Make Rectification, dated Aug. 11, 2021 (Machine Translation).

China Application Serial No. 202022136114.2, intent to Grant, dated Oct. 19, 2021.

China Application Serial No. 202022136114.2, Response to First Notification to Make Rectification, dated Sep. 26, 2021 (Machine Translation).

U.S. Appl. No. 16/791,409, filed Feb. 14, 2020.

U.S. Appl. No. 16/867,298, filed May 5, 2020.

U.S. Appl. No. 16/719,409, Notice of Allowance, dated Dec. 13, 2021.

\* cited by examiner

DEVICES, SYSTEMS AND PROCESSES FOR ULTRA-SHORT RANGE DETECTION OF OBSTACLES

CROSS REFERENCE TO RELATED APPLICATIONS

The present application relates to co-pending U.S. application Ser. No. 16/724,783, which was filed on Dec. 23, 2019, in the name of inventors Tomas Suchy, Jiri Kantor and Marek Hustava, and is entitled "Piezoelectric Transducer Controller Having Model-Based Sideband Balancing," (herein, the "183 App."). The present application also relates to co-pending U.S. application Ser. No. 15/784,345, which was filed on Oct. 16, 2017, in the name of inventors Marek Hustava, Tomas Suchy, Michal Navratil, and Jiri Kutej and is entitled "Reducing or Eliminating Transducer Reverberation" (herein, the "'345 App."). The present application also relates to co-pending U.S. application Ser. No. 15/888,543, which was filed on Feb. 5, 2018 in the name of inventors Kutej et al. and is entitled "Response-Based Determination of Piezoelectric Transducer State" (herein, the "'543 App."). The present application also relates to U.S. application Ser. No. 12/768,941, which was filed on Apr. 28, 2010, in the name of inventors Pavel Horsky et al, is entitled "Acoustic Distance Measurement System Having Cross Talk Immunity, issued as U.S. Pat. No. 8,416,641 on Apr. 9, 2013 and also published as EP 2383583A2 (herein, the "'941 App.").

The entire contents of each of the above identified applications and patents are incorporated herein by reference.

TECHNICAL FIELD

The technology described herein generally relates to devices, systems, and processes for detecting obstacles. More specifically, the technology relates to parking assist sensors and other sensors used for detecting obstacles. Even more specifically, the technology relates to ultra-sonic sensors to detect obstacles.

BACKGROUND

Today, various sensor systems are used with motor vehicle and other systems. Examples of such sensor systems include parking assist sensors, back-up sensors, blind spot detection sensors, collision avoidance, and others (collectively, herein each sensor a "PAS" sensor and a collection of sensors forming a PAS system). PAS systems are often used to assist a vehicle driver during parking, such a parallel parking, during lane changes, collision avoidance, and otherwise. A vehicle driver may range from a person to a fully automated/self-driving driving vehicle system. A PAS system often operates based upon sonar type principles, whereby an ultra-sonic soundwave is emitted and, based upon the reception of an echo, obstacles (if any) to be avoided are detected. Such obstacles may be of any form or type including, but not limited to, other vehicles, pedestrians, animals, fixtures (such as light poles, building portions and the like), and otherwise. The obstacle may be fixed or moving.

PAS systems typically are configured to detect obstacles over varying distances from the sensor, using sonar principles, and based upon a lapse of time between an emitting of a ranging signal and a reception of an echo, with the emission and reception being performed commonly by the same transponder. The varying distances may be those desired for a given PAS sensor and may include detections of obstacles that are located, relative to the transponder, within a given distance range, such as: (a) ultra-short range, i.e., less than ten (10) centimeters; (b) short range, i.e., between ten (10) centimeters and one and one-half (1.5) meters; (c) mid-range, i.e., between one and one-half (1.5) and two (2) meters; and (d) long-range, i.e., between two (2) and seven (7) meters. In a PAS system, some PAS sensors may be configured for detecting obstacles at one or more distance ranges. The present disclosure is concerned with detecting obstacles at ultra-short ranges. Today, devices, systems and processes for detecting obstacles within ultra-short ranges are needed. More specifically, devices, systems and processes are needed for detecting obstacles within five (5) to seven (7) centimeters.

As is commonly known, a PAS sensor commonly emits ranging signals using a piezoelectric transducer (herein, a "transducer"). The ranging signals may be emitted as one or more pulses (or bursts of ultra-sonic sound waves). A non-limiting example of a transducer and one or more circuit elements for use therewith are described in paragraph [0030] of the '543 App. For some PAS sensor functions, such as a blind spot detection system, the pulses may be repeatedly emitted while the vehicle is traveling. For other PAS sensor functions, the pulses may be emitted only while the vehicle is configured for use during certain vehicle operations, such as parking, when in a reverse gear, or otherwise.

Current PAS sensors, however, are limited by a period of time (herein, a "reverberation period") during which the PAS sensor is essentially incapable of detecting echoes. The reverberation period typically lasts until an amplitude of such reverberations falls below a given threshold (the "reverberation-echo threshold (RET)"), at which instance echo detection is possible. While such reverberations occur internal to the transducer and are often not emitted as ranging signals, their effects are significant to PAS sensor operation and capabilities. The RET is typically unique to each type of transducer, and may vary by transmission amplitude, frequency, phase, temperature, and other factors.

Before such reverberations are sufficiently dampened below the RET, PAS sensors commonly do not process or accurately detect echoes reflected off of an obstacle located within a given range of the sensor, such as at an ultra-short range. The RET typically does not affect PAS sensor sensitivity at non-ultra-short ranges, such as short range, mid-range, or long range. Due to the sonar principles used in PAS systems, the RET effectively limits to a "minimum detection distance" (MDD)—i.e., a minimum distance within which obstacles can be detected to the distance corresponding to time at which a crossing of the RET occurs. Simply put, the RET crossing time equates to an MDD. This MDD phenomenon is taught, for example, in paragraph [0014] of the '345 App. and as further shown in FIG. 2 therein (which is reproduced herein as FIG. 1, as further annotated herein).

Even more specifically, a transducer effectively operates over three time periods with respect to any given ranging signal. First, the ranging signal is transmitted over a transmission period ("TP") 100, then a "reverberation" period ("RP") 102 arises and during which echo detection is not possible, and then a period of echo detection ("EDP") 104 occurs. As per above the EDP begins at the RET, i.e., when the amplitude of the reverberations fall below the given RET threshold 106. These periods arise for each operating cycle for a PAS system. As further discussed in the '345 App., during the reverberation period 102, the PAS sensor is effectively blind and incapable of detecting obstacles.

As further shown in FIG. 1 and as starting from earliest time, the leftmost peak in magnitude illustrates transmission of the pulse toward the obstacle. The next peak illustrates the reverberation caused by the pulse transmission. As can be seen, the reverberation has a higher magnitude than an echo detection threshold, represented by the horizontal line, for a substantial length of time (even longer than the transmission). Echoes may be detected only when the reverberation magnitude is under the echo detection threshold 106. The third peak illustrates an echo received at the transducer. Should such an echo be received during the time the reverberation exceeds the threshold, then the echo would not be detected or correctly interpreted as an echo. As such, in this example, the third peak may be a second or third echo (the first or second echo being obscured by the reverberation). By reducing or eliminating the reverberation, obscured echoes can be detected.

Thus, it is to be appreciated that a decrease in the amplitude of the reverberations during the reverberation period (RP) 102 effectively results in the reverberations earlier falling under the RET threshold 106, which results in a reduction in the minimum detection distance for a given transducer and thereby improves the sensitivity (detection ability) of a given PAS sensor to include detection of obstacles within the ultra-short range. Accordingly, devices, system and processes are needed for reducing the reverberation period and, thereby, the minimum detection distance (MDD) of PAS sensors.

SUMMARY

The various embodiments of the present disclosure describe devices, systems, and processes for reducing the reverberation period and the minimum detection distance of PAS sensors.

In accordance with at least one embodiment of the present disclosure, a process for facilitating ultra-short range detection of obstacles using a PAS sensor may include obtaining a correlation of at least two characteristics of a transducer, determining a given transmission frequency for the transducer, selecting a reverberation time desired for the transducer, obtaining a damping ratio corresponding to the selected reverberation time, generating a ranging signal command, generating a damping signal command, and outputting each of the ranging signal command and the damping signal command. For at least one embodiment, the ranging signal command may instruct a PAS sensor to drive the transducer to output a ranging signal at the given transmission frequency, at a transmission amplitude, and at a transmission phase. For at least one embodiment, the damping signal command may result in a dampening, at the damping ratio, of transducer reverberations arising from the ranging signal.

For at least one embodiment of the present disclosure, the at least two characteristics of a transducer may include at least two of the given transmission frequency, the reverberation time, and the damping ratio. The at least two characteristics of a transducer may be obtained from a storage medium populated based on at least two calibrations of the transducer.

For at least one embodiment of the present disclosure, the at least two calibrations of the transducer may occur during each of production and during operational use of the transducer. Each of the at least two calibrations of the transducer may establish a relationship between a temperature of the transducer and a transmission frequency for the transducer.

For at least one embodiment of the present disclosure, the damping ratio may be between thirty percent (30%) and eighty percent (80%) of the transmission amplitude. The damping signal command may result in a providing of the damping signal having a damping phase that is substantially opposite the transmission phase. The damping signal command may also result in a providing of the damping signal having a damping phase that is one hundred and eighty degrees out of phase with the transmission phase.

For at least one embodiment of the present disclosure, the at least two characteristics of the transducer may include, for a specified transmission frequency, the damping ratio to utilize to obtain the selected reverberation time.

In accordance with at least one embodiment of the present disclosure, a PAS sensor for detecting obstacles may include a transducer configured to generate a ranging signal and receive an echo signal. The ranging signal may be characterized by a transmission amplitude, a transmission frequency, and a transmission phase. The PAS sensor may also include a transmit driver, coupled to the transducer, configured to generate a damping signal useful in damping reverberations in the transducer from generation of the ranging signal. The damping signal may be characterized by a damping amplitude, a damping frequency, and a damping phase.

For at least one embodiment of the present disclosure, a PAS sensor may include a controller, coupled to a transmit driver, configured to generate a damping signal command. The damping signal command may instruct the transmit driver to generate the damping signal based upon a given transmission frequency of a transducer. For at least one embodiment, the damping signal command may instruct the transmit driver to generate the damping signal based upon a damping ratio. For at least one embodiment, the damping signal command may instruct the transmit driver to generate the damping signal based upon a reverberation time.

For at least one embodiment of the present disclosure, a PAS sensor may include a controller configured to generate a damping signal command based upon at least one entry provided in a look up table. The look up table may provide at least one correlation of a reverberation time and a damping ratio. For at least one embodiment, the controller may be further configured to communicate, in the damping signal command, the damping ratio selected from the look up table. The damping signal may be generated by a transmit driver based upon the selected damping ratio.

For at least one embodiment, the controller may be configured to generate the damping signal command based upon a determined given transmission frequency of the transducer.

For at least one embodiment, the controller may be configured to determine a given transmission frequency based upon a calibration of a transducer. The calibration of the transducer may generate a correlation of a temperature with each transmission frequency for the transducer. A controller may be thermally coupled to the transducer by a first input terminal. The determined given transmission frequency of the transducer may be determined based upon a temperature of the first input terminal.

For at least one embodiment, the damping phase may be opposite the transmission phase. For at least one embodiment, the damping amplitude may be between forty five percent (45%) and sixty five percent (65%) of the transmission amplitude. For at least one embodiment, the damping frequency may be within twenty percent (20%) of the transmission frequency.

In accordance with at least one embodiment of the present disclosure a system, for determining distances of an article from an obstacle may include a first PAS sensor, provided with an article, configured to detect an obstacle at a first ultra-short range distance from the article by damping reverberations arising in a first transducer after transmission of a first ranging signal from the article and towards the obstacle. The first PAS sensor may also be configured to receive an echo signal reflected off the obstacle and output a modified first echo signal. The system may also include a second PAS sensor configured to detect the obstacle at a second ultra-short range distance from the article by damping second reverberations arising in a second transducer after transmission of a second ranging signal from the article and towards the obstacle. The second PAS sensor may also be configured to receive a second echo reflected off the obstacle and output a modified second echo signal. The system may also include an electronic control unit configured to receive the modified first echo signal and the modified second echo signal and determine a minimum distance of the article from the obstacle by use of triangulation of the modified first echo signal and the modified second echo signal.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems and processes for reducing the reverberation period (RP) of a transducer and, thereby, the minimum detection distance (MDD) of a PAS sensor. In accordance with at least one embodiment of the present disclosure, devices, systems and processes are provided for reducing the reverberation period (RB) by providing one or more counter phase driving pulses (herein, "damping signals") to a transducer used in a PAS sensor.

Figure 1:
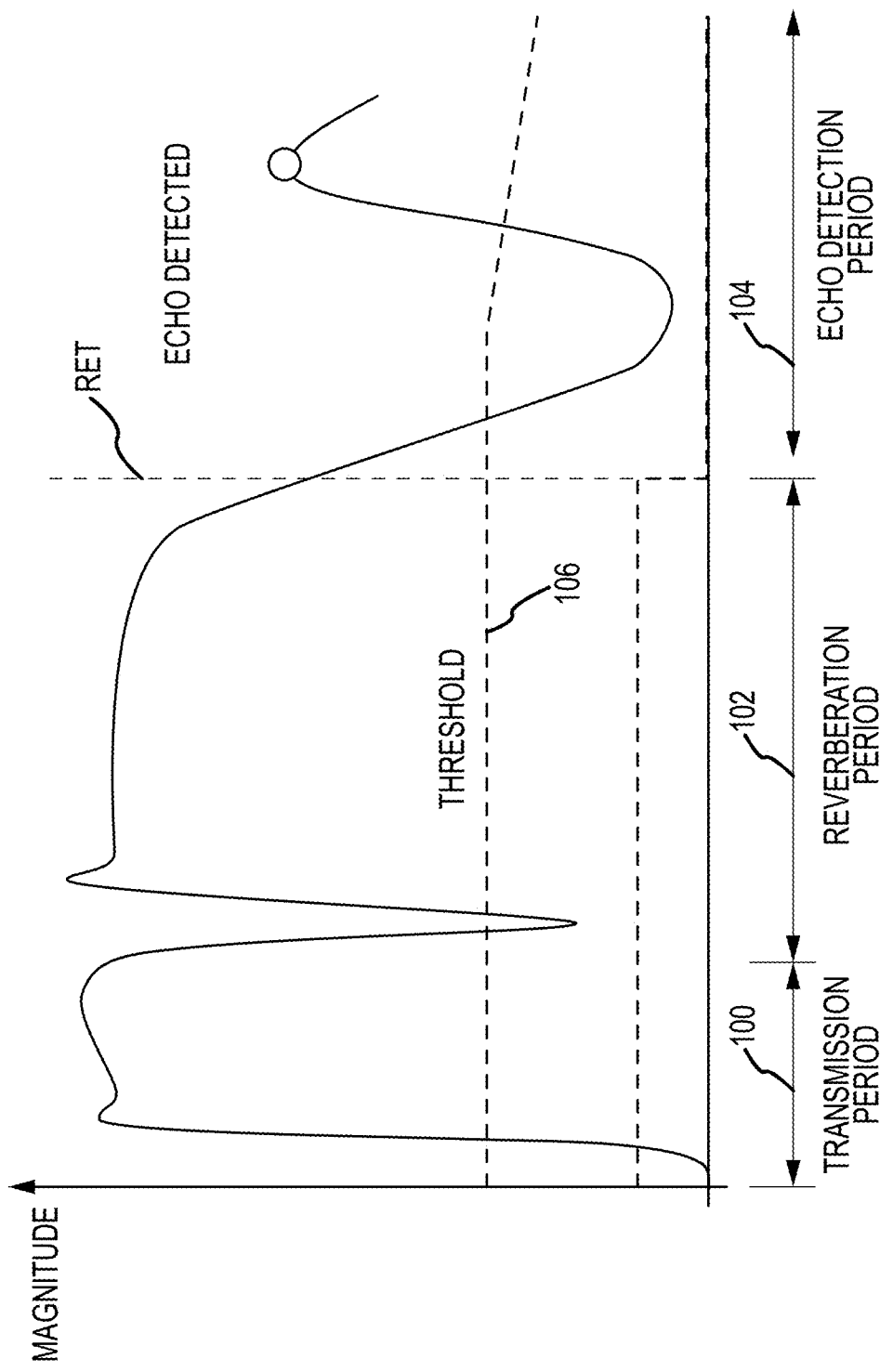
FIG. 1 is a prior art chart illustrating pulse transmission, reverberation, and echo detection periods as taught in the '345 App.
Figure 2:
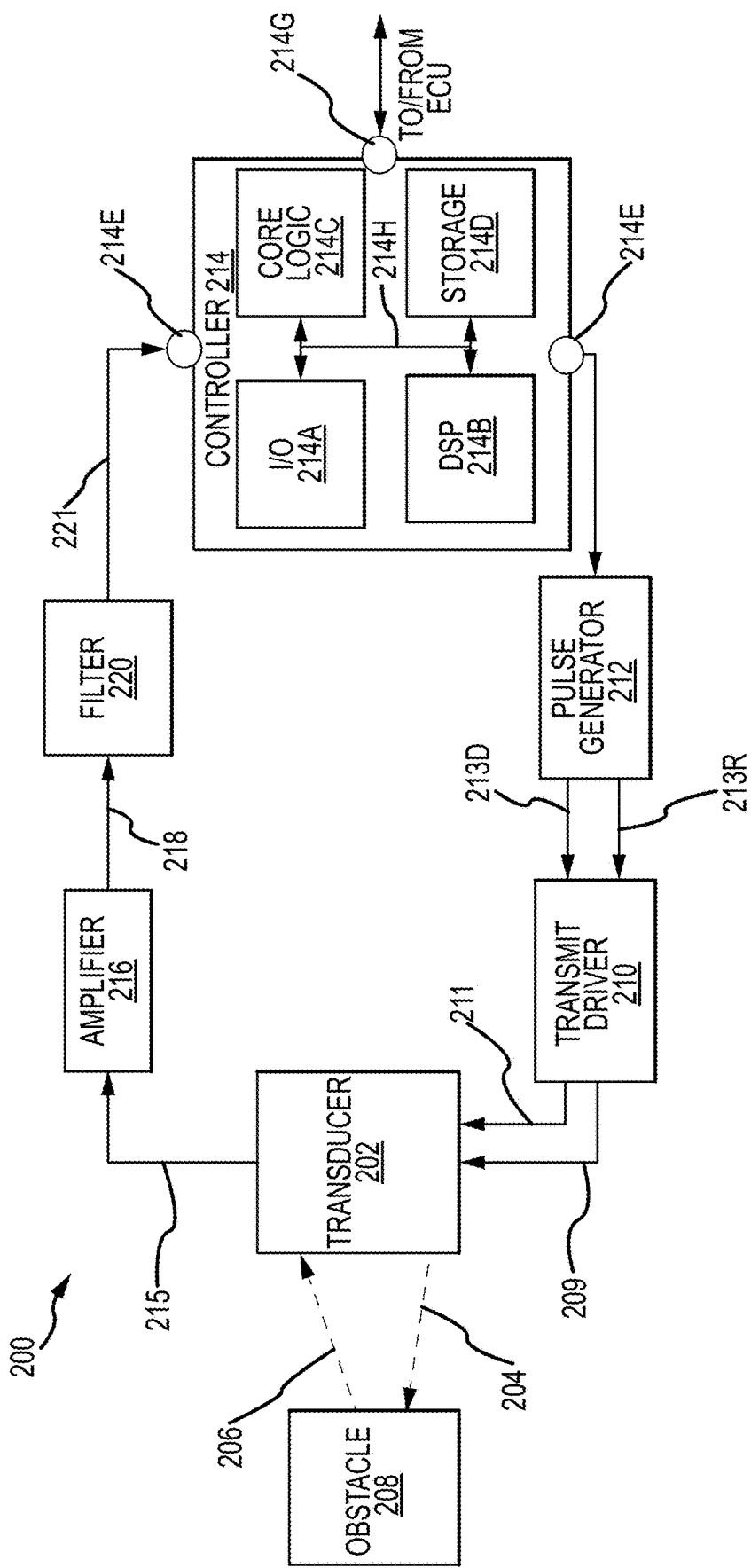
FIG. 2 is schematic diagram of a PAS sensor for use in facilitating ultra-short range detection of obstacles and in accordance with at least one embodiment of the present disclosure.

As shown in FIG. 2, a system 200 for reducing a reverberation period for a PAS sensor may include a transducer 202 configured to emit one or more ranging signals 204. The transducer 202 may include one or more supporting circuit elements, the same being well known in the art, that facilitate the sending of ranging signals 204. As discussed below, the transducer 202 may also be configured to receive one or more echo signals 206. The one or more echo signals 206 may be received after having been reflected off an obstacle 208 within a given distance range of the transducer 202. The distance range of the transducer 202 may be fixed and/or vary over time. For purposes of the present disclosure, PAS sensors 200 for use in detecting obstacles 208 within the ultra-short range are described. Such PAS sensors 200 may be configurable for use in detecting obstacles 208 over other distance ranges.

Ranging Signal Generation

The transducer 202 may be electrically coupled to a transmit driver 210. The transmit driver 210 may be suitably configured to provide one or more intermediate ranging signals 209 to the transducer 202. The transducer 202 uses the intermediate ranging signals 209 to generate the ranging signals 204. The respective generation of intermediate ranging signals 209 by a transmit driver 210 and generating of ranging signals 204 by a transducer 202 is well known in the art. A non-limiting example of a circuit for generating such signals is taught in '941 App. with reference to FIGS. 4 and 5 and paragraphs [0020] to [0022] therein. But, any currently arising or later arising technologies for use in generating the intermediate ranging signals 204 and/or the ranging signals 204 may be used for at least one embodiment of the present disclosure.

The intermediate ranging signals 209 and the ranging signals 204 may be modulated. It is to be appreciated that a modulation pattern may be used to distinguish a first ranging signal (and any echoes thereof) from a first PAS sensor from one or more, respective, second ranging signals (and echoes thereof) from one or more second PAS sensors. For purposes of the present disclosure, any desired modulation scheme may be used.

The ranging signals 204 may be generated by the transducer 202 from one or more intermediate ranging signals 209 received from the transmit driver 210. The intermediate ranging signals 209 may facilitate transmission of a ranging signal 204 at a then desired (a.k.a., "given") transmission amplitude ("Ta"), for a given transmission frequency ("Tf"), and for a given transmission phase ("Tp"). As discussed in the '783 App., one or more of the transmission frequency Tf, phase Tp and amplitude Ta may vary over time. For at least one embodiment, the transmission phase Tp is substantially constant over time when damping signals are not used. For example, when obstacles at distances beyond the ultra-short range are to be detected, constant phase pulses may be used, such as 16× pulses for a standard AM measurement mode, which each of the 16×AM pulses having a constant phase. For such an application, a minimum detection distance is ~12 cm and a maximum detection distance is ~4.5 m.

As is well known in the art and taught, for example, in the '783 App., equivalent circuit element models may be used to estimate a given transmission frequency Tf for the transducer 202. More specifically, one non-limiting example of such a circuit model is taught in the '783 App. and may be used in accordance with at least one embodiment of the present disclosure. More specifically and for at least one embodiment, the teachings of paragraph [0027] and FIG. 4 of the '783 App. may be used to generate a circuit replacement model. Further, the teachings of paragraphs [0030] to [0050] and FIGS. 6, 7A, 7B and 8 of the '783 App. may be used to measure one or more characteristics of the transducer 202 during one or more calibration operations.

It is to be appreciated that one or more calibration operations may be performed in a manufacturing or test environment. Likewise, one or more calibration operations may be performed in a field/deployed environment, such as on a periodic basis, on an as-needed basis, such as in response to an error detection, when a given PAS sensor 200 is experiencing a "down-time" (e.g., the transducer 202 for a given PAS sensor 200 is not being actively used for ranging and/or obstacle detection purposes), or otherwise. Calibration operations may be used to determine given operating characteristics for the transducer 202. One such operating characteristic may include the given transmission frequency Tf. As discussed below, the given transmission frequency Tf may be used in determining one or more characteristics of one or more damping signals 211 provided to the transducer 202. Such one or more damping signals 211 may effectively reduce the amplitude of one or more reverberations arising during the reverberation period (RP) 102 and thereby result in an earlier decrease of such reverberations below the RET 106 than would occur absent the use of one or more damping signals 211. As discussed above, the earlier a transducer 202 exits a reverberation period 102, the earlier echoes can be detected which correlates to a detection of obstacles 208 at closer distances to a given transducer 202, such as at within an ultra-short range. Further, other known and/or later arising models, circuits, methods and the like for estimating a given transmission frequency Tf or other defining operating characteristic for the transducer 202 may be used in accordance with at least one embodiment of the present disclosure in generating a damping signal 211.

As discussed above, the ranging signal 204 may be generated from one or more intermediate ranging signals 209 generated by the transmit driver 210. Like the ranging signal 204 and for at least one embodiment, the intermediate ranging signals 209 may also have a corresponding given transmission frequency Tf, a given transmission phase Tp, and a given transmission amplitude Ta.

The transmit driver 210 may also be coupled to a pulse generator 212. The pulse generator 212 may be configured to generate the one or more ranging pulses 213R. The ranging pulses 213R may be sent to the transmit driver 210 for generation of the intermediate ranging signal 209. As discussed above, the intermediate ranging signal 209 may specify a desired transmission amplitude Ta, phase Tp and frequency Tf. For at least one embodiment, the ranging pulses 213R may be generated based on a desired transmission frequency Tf and a desired transmission phase Tp. For at least one embodiment, such ranging pulses 213R are generated based upon use of a Welch window function. It is to be appreciated that other window functions that reduce driving signal side lobe spectral densities may be used for other embodiments of the present disclosure. It is to be appreciated that by eliminating the spectral density of side lobes, a reduction in RET (reverberation period) by a given transducer 202 may occur.

For at least one embodiment, a modulation scheme (if any) may be used to identify and distinguish a given ranging signal 204 for a given transducer 202, and any received echo signals 206 thereof, from ranging and echo signals associated with another transducer. For at least one embodiment, such modulation scheme may be generated by the pulse generator 212. The generation of modulate pulse signals is well known in the art and is not discussed further herein.

The pulse generator 212 may generate the ranging pulse 213R as an AM, dual AM, up-chirp, a down-chirp, or a variable-chirp of custom bandwidth, duration, and center frequency as desired. The pulse generator 212 may also adjust the ranging pulses 213R based on feedback from previous measurements. For example, the ranging pulses 213R may be adjusted based on minimum detection distance (with increased pulse duration, minimum distance is increased); signal-to-noise ratio and maximum detection distance (with increased pulse duration, signal-to-noise ratio and maximum detection distance are increased); reliability of channel separation (with increased pulse duration, channel separation is improved); time-of-flight accuracy and resolution (a wider bandwidth results in improved accuracy and resolution); transducer bandwidth; and the like. The pulse generator 212 supplies the generated damping and ranging pulses 213D and 213R to the transmit driver 210, which transforms the pulses into an appropriate signal for the transducer 102 to transmit. For at least one embodiment, the transmit driver 110 embeds the pulse within an appropriate carrier to transmit the pulse over a given transmission channel. The transmit driver 110 then supplies the intermediate ranging signal 209 to the transducer 102, which transmits the ranging signal 204 toward the obstacle and receives the echo signal 206.

The pulse generator 212 may be coupled to a controller 214 (as further described below).

Damping Signal Generation

For at least one embodiment, a damping signal 211 may be generated by the transmit driver 210 and provided to the transducer 202. A corresponding damping signal is typically not emitted by the transducer. The damping signal 211 will have a damping frequency ("Df"), a damping phase ("Dp"), and a damping amplitude ("Da"). For at least one embodiment, the damping frequency Df is substantially the same as the given transmission frequency Tf. For at least one embodiment, the damping phase Dp is substantially opposite the transmission phase Tp. For at least one embodiment, the damping phase Dp is one-hundred and eighty degrees (180°), plus or minus ten percent (±10%) different in phase than the transmission phase Tp. For at least one embodiment, the damping amplitude Da is proportional to the transmission amplitude Ta. Herein, such proportion is referred to as a damping ratio ("Dr"). For at least one embodiment, the damping ratio Dr may be expressed as a ratio of an input current of the damping signal 211 versus the input current of the intermediate ranging signal 209—such input currents being provided by the transmit driver 210 to the transducer 202 for each operating cycle.

For at least one embodiment, the damping ratio Dr varies between thirty percent and eighty percent (30%-80%). For at least one embodiment, the damping ratio Dr is between forty-five percent to sixty-five percent (45%-65%). For at least one embodiment, the damping amplitude Da is determined by use of damping ratio Dr specified in a Look-Up Table ("LUT"). As further discussed below and for at least one embodiment, the LUT may identify a relationship between each of a duration for a given reverberation period RP, a damping ratio Dr specifying a ratio of a damping amplitude Da to transmission amplitude Ta, at one or more transmission frequencies Tf. It is to be appreciated that in accordance with at least one embodiment of the present disclosure obstacles may be detected within seven to eight centimeters (7 cm) of a PAS sensor 200 when damping is used and within ten to thirteen centimeters (10-13 cm) of the PAS sensor 200 when damping is not used. With damping and multi-sensor triangulation, as discussed below, obstacles may be detected within five centimeters (5 cm) of a PAS sensor system 300.

Based upon the given transmission frequency Tf, the various embodiments of the present disclosure may be configured to adjust the damping amplitude Da to reduce transducer 202 reverberations. By reducing such reverberations, the reverberation period RP 102 may be shortened, which thereby facilitates earlier obstacle detection and, thereby, obstacle detection at shorter ranges, including at ultra-short ranges.

The pulse generator 212 may also be configured to generate one or more damping pulses 213D. The damping pulses 213D may be similarly generated as the ranging pulses 213R are generated. The damping pulses 213D are sent to the transmit driver 210 for generation of the damping signal 211. As discussed above, the damping signal 211 effectively reduces the amplitude of the reverberations and thereby hastens the reverberation-echo threshold crossing RET 106. In short, as processed by the transducer 202, the damping signal(s) 211 effectively shorten the reverberation period RB 102.

In accordance with at least one embodiment, the damping pulses 213D may specify a desired damping amplitude Da, damping frequency Df, and a damping phase Dp for the transmit driver 210 to output in the damping signal 211.

Echo Signal Reception

As discussed above, the transducer 202 may also be configured to receive echo signals 204. For at least one embodiment, the transducer 202 may be configured to output, in a received signal 215, any reverberation induced signals detected during the reverberation period RP 102 and any echo signals 206 received during the echo detection period EDP 104. A non-limiting example of a transducer 202 so configured is taught in the '941 App. with reference to FIGS. 5 and 6 therein and paragraphs [0021] to [0023].

The transducer 202 may be coupled and provide the output signal 215 to an amplifier 216. It is to be appreciated that the detected reverberations and received echo signals 206 may be in the millivolt or microvolt range. For at least one embodiment, a low-noise amplifier 206 may be used to amplify the output signal 215. Likewise, the ranging signal 204 may over-drive the receiving side of the PAS sensor 200. Accordingly and for at least one embodiment, while the transducer 202 is being actively driven by the transmit driver 210, the output signal 215 may be clamped at the input to the amplifier 216. The amplifier 216 may output an amplified echo signal 218. For at least one embodiment, the amplified echo signal 218 may be allowed to saturate at a given voltage, such as at an internal supply voltage. The amplified echo signal 218 may be filtered by a filter 220. The filter 220 may include analog to digital (A/D) and other signal conversion and pre-processing components—such components being well known in the art. The filter 220 may be configured to output a filtered echo signal 221 to a first input terminal 214E of the controller 214.

Controller 214

The controller 214 may include an input/output (I/O) component 214A, a digital signal processor (DSP) 214B, a hardware based core logic 214C, a storage component 214D and internal bus 214H or other data transport structure communicatively coupling such components. Each of these components are further described below. For at least one embodiment, one or more of the transmission amplitude Ta, transmission frequency Tf, transmission phase Tp, damping amplitude Da, damping frequency Df, and the damping phase Dp may be specified by the controller 214 to the pulse generator 212. For at least one embodiment, one or more of the transmission amplitude Ta and the transmission phase Tp may be fixed and/or may not substantially vary. When the transmission phase Tp is fixed and/or insubstantially varies, the damping phase Dp may also be fixed. For at least one embodiment, it is to be appreciated that each of the transmission frequency Tf, the damping amplitude Da, and the damping frequency Df will vary over time.

I/O Component 214A

For at least one embodiment, the input/output component (I/O) 214A may be configured to couple the controller 214 with other PAS sensor 200 components and with external components, such as an electronic control unit (ECU), as further described below. More specifically, the I/O 214A may include well known circuit components for coupling the controller 214 with PAS sensor 200 components via at least one first input terminal 214E, at least one first output terminal 214F and with the ECU via an ECU terminal 214G. These terminals 214E-G and the I/O 214A may utilize any known and/or later arising device connection components and/or technologies for communicating data between the controller 214, other PAS sensor components and the ECU 300.

DSP 214B

For at least one embodiment, the DSP 214B may be configured to process the filtered echo signal 221 and output, via the ECU terminal 214G, processed echo data. The processed echo data may be provided to the ECU 300 (as described below) for use in multi-sensor obstacle distance determinations, and other operations.

More specifically and for at least one embodiment, the DSP 214B may be configured to apply programmable methods to process the filtered echo signal 221, e.g., measure the transmission period 100 of the transducer 202, detect the ensuing reverberation period RP 102, and to detect and measure the timing of any received echo signals 206. Such methods may employ filtering, correlation, threshold comparisons, minimum intervals, peak detections, zero-crossing detection and counting, noise level determinations, and other customizable techniques tailored for improving reliability and accuracy.

The DSP 214B may be further configured, for at least one embodiment, to process the filtered echo signal 221 and based thereon analyze and determine one or more characteristics of the transducer 202, such as the transmission amplitude Ta, transmission frequency Tf and transmission phase Tp. Such one or more characteristics may be used by the core logic 214C in determining one or more characteristics of a damping signal 211 to ultimately be provided to the transducer 202 for the given PAS sensor 200.

For at least one embodiment and for obstacle detection, the DSP 214B may be configured to apply programmable methods to control the transmission period 100 of the transducer 202, during which one or more ranging signals 204 are transmitted and to detect and measure the lengths of any received echoes 206 during the echo period 106. Such methods may employ threshold comparisons, minimum intervals, peak detections, zero-crossing detection and counting, noise level determinations, and other customizable techniques tailored for improving reliability and accuracy. The DSP 214B may further process the filtered echo signal 221 to analyze characteristics of the transducer 202, such as resonance frequency and quality factor, and may further detect transducer fault states as taught by the '543 App. Some fault states may be indicated by, e.g., an excessively short actuation period (which may be due to a disconnected or defective transducer, suppressed vibration, or the like), while others may be indicated by an excessively long actuation period (defective mounting, inadequate damping resistance, or the like). As discussed further below, for at least one embodiment of the present disclosure, damping signals 211 are not generated during one or more of such detected transducer fault states.

The DSP 214B may also be configured to determine a given transmission frequency Tf for the transducer 202. It is to be appreciated that the transmission frequency Tf may vary over time. Approaches for determining a given transmission frequency Tf are taught in the '783 App. and one or more of such approaches may be used for at least one embodiment of the present disclosure. More specifically, a sensing method for determining variances in one or more transducer characteristics is provided in paragraphs [0040] to [0050] and FIG. 8 of the '783 App. Such method may be used in conjunction with at least one embodiment of the present disclosure.

Core Logic 214C

The core logic 214C may be provided using any hardware data processing device configured to perform one or more computer executable operations. The core logic 214C may be provided by any local processing device capable of executing one more non-transient computer executable instructions (herein, each a "computer instruction") which, in accordance with an embodiment of the present disclosure, facilitate one or more data processing operations. For at least one embodiment, the core logic 214C may include one or more hardware processors, such as 32-bit and 64-bit central processing units, multi-core ARM based processors, microprocessors, microcontrollers, application specific integrated circuits (ASICs), and otherwise. The computer instructions may include instructions for executing one or more applications, software engines, and/or processes configured to facilitate operations of the PAS sensor 200 for obstacle detection at ultra-short ranges. Such hardware and computer instructions may arise in any desired computing configuration including, but not limited to, local, remote, distributed, blade, virtual, or other configurations and/or systems configured for use in support of the one or more embodiments of the present disclosure.

The core logic 214C may be configured to receive one or more components for the filtered echo signal 221. For example, the core logic 214C may be configured to receive reverberation data provided in the filtered echo signal 221. Using such received reverberation data and one or more computer instructions, the core logic component 214C may be configured to perform various calculations and arrive at various ranging signal and damping signal determinations. Such ranging signal and damping signal determinations may be used in instructing the pulse generator 212 as to one or more of a transmission amplitude Ta, transmission frequency Tf, transmission phase Tp, damping amplitude Da, damping frequency Df, damping phase Dp, damping ratio Dr and otherwise for a transducer 202 to use during a next operating cycle for the PAS sensor 200.

For at least one embodiment, the core logic 214C may be configured to determine one or more of a reverberation time ("Rt") arising at a given transmission frequency Tf, and the damping ratio Dr then utilized for the given operating cycle. For at least one embodiment, the given damping ratio Dr may be used in determining any adjustments to be made, if any, to a next damping ratio Dr to be used for a following operating cycle for a given PAS sensor 200.

For at least one embodiment, the core logic component 214C may be configured separately and/or in conjunction with the I/O 214A, to monitor an "input" temperature at the first input terminal 214E. It is to be appreciated that for at least one embodiment a thermo-coupling may arise between the transducer 202 and the controller 214 such that a detected temperature at the first input terminal 214E may represent the current operating temperature of the transducer 202. As discussed in the '783 App. and elsewhere in the prior art, the transducer temperature may influence and indicate one or more characteristics of the transducer 202 including, but not limited to, the transmission frequency Tf. Accordingly and for at least one embodiment of the present disclosure, the temperature at the first input terminal 214E, and/or changes thereto over time, may be used by the core logic 214D in determining one or more given characteristics of the transducer 202, such as the given transmission frequency Tf. Such current characteristics may be used in determining a damping ratio Dr and/or other damping signal and/or ranging signal characteristics to use for a next operating cycle of the transducer 202.

For at least one embodiment, the core logic 214C may be configured to analyze and determine from the received beaming and/or reverberation signal one or more characteristics of the transponder 202 occurring during the reverberation period (RP) 102 including, but not limited to, a reverberation frequency ("Rf"), a reverberation duration ("Rd"), a reverberation phase ("Rp"), which may vary from the transmission phase Tp, the RET 106, and other reverberation related characteristics of the transducer 202.

For at least one embodiment, the core logic component 214C may be configured to determine the damping ratio Dr, and thereby the damping amplitude Da, to use at a given time by use of a Look-Up Table ("LUT"). As further discussed below, the LUT may identify a duration for a given reverberation period RP as depending upon a ratio of damping amplitude Da to transmission amplitude Ta at one or more transmission frequencies.

LUT

Figure 6:
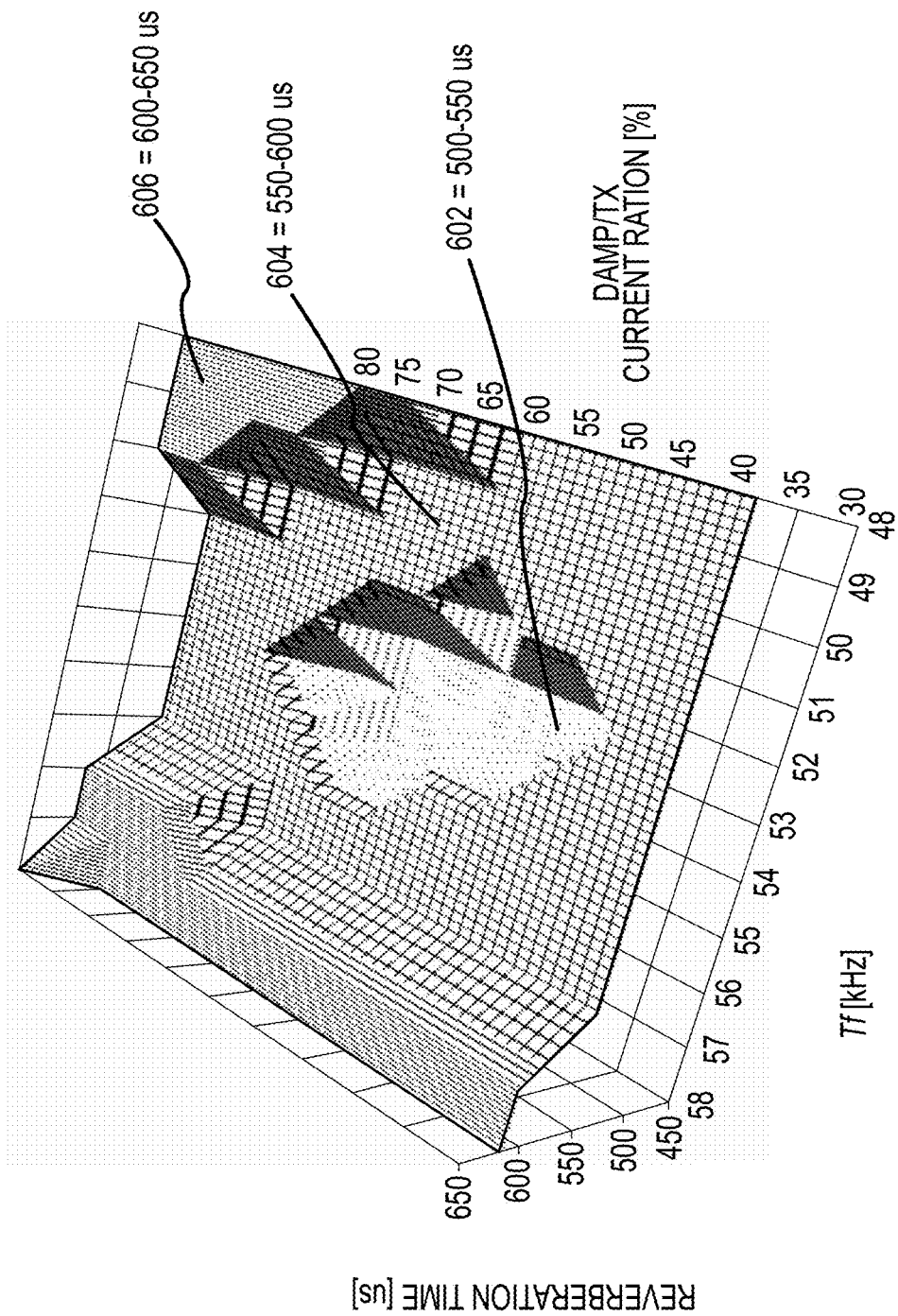
FIG. 6 is topographical representation of data provide in a look up table used by a controller in a PAS sensor to facilitate ultra-short range detection of obstacles and in accordance with at least one embodiment of the present disclosure.

As described above, the core logic 214C may use a look-up table (LUT) in determining a damping ratio Dr to use for a next operating cycle for a PAS sensor 200. LUT 1 below provides a non-limiting example of a LUT for an exemplary PAS sensor 200. It is to be appreciated that values for a given LUT may be determined during calibration, testing, and other operations. Fewer or greater numbers of determinations may be made for any given LUT and for any given PAS sensor 200. For at least one embodiment, a LUT provides a reverberation period that arises for a given transmission frequency Tf and a given damping ratio Dr. For example, for a first transmission frequency Tf of 52 kHz and when a damping ratio, Dr of fifty-percent (50%) is used, the reverberation time (in microseconds, μs) is 563.2 μs. Contrarily, when a Dr of sixty-percent (60%) is used, the reverberation time is reduced to 512 μs. Thus, by modifying the damping ratio from 50% to 60%, it is to be appreciated that an obstacle may be detected 51 μs sooner, which equates at the speed of sound of 340.3 m/s (meters per second), at sea level, to an improved detection distance of approximately 1.74 cm. FIG. 6 provides a graphical representation of three ranges of data values provided in LUT 1. Specifically, a first range 602 provides for a reverberation time of 500-500 μs, a second range 604 provides for a reverberation time of 550-600 μs and a third range 606 provides for a reverberation time of 600-650 μs. Based upon the given transmission frequency Tf (with the same frequency to be used for the damping pulses), the core logic 214C may select a damping ratio Dr best suited to achieve obstacle detection within an optimal ultra-short range. It is to be appreciated that for at least one embodiment, an optimal ultra-short range may not equate to a shortest possible reverberation time and, instead, vary be determined based upon one or more operating conditions, such as a given vehicle operating condition (e.g., is the vehicle currently in self-parking mode), environmental conditions (e.g., are the windshield wipers then operating, indicating rain fall which may generate false echoes), and/or other conditions. Such operating conditions may be communicated to the core logic 214C by the ECU 300, as desired for any given embodiment.

For at least one embodiment, the damping ratio Dr selected may depend upon an ability of a given PAS sensor 200 to generate damping signals 211 as close as possible to a given transmitting frequency Tf. For at least one embodiment, the core logic 214C may be configured to select a damping frequency Df and a corresponding damping ratio Dr that minimizes the introduction of higher harmonics into the transducer 202. Such higher harmonics may result in false echo detections. Further, the damping frequency Df and damping ratio(s) Dr used may be selected by the core logic 214C to shape the reverberations and reduce and/or prevent the introduction of undesired harmonics into the received signal 215. For at least one embodiment, the damping amplitude Da has the same shape and duration as the transmission amplitude Ta. For at least one embodiment, one or more of the damping amplitude Da, damping frequency Df, and damping phase Dp may vary by ±20% from a given to a next operating cycle.

In accordance with at least one embodiment, the core logic 214C may also be configured to provide inputs to the pulse generator 212 which specify how many ranging pulses, the shape of such ranging pulse, and the number of damping pulses are to be used for a next operating cycle. For at least one embodiment, two ranging pulses 213R followed by two damping pulses 213D are used for a given operating cycle of the PAS sensor 200. For another embodiment, one ranging pulse 213R followed by one damping pulse 213D is used. For another embodiment, four ranging pulses 213R followed by two damping pulses 213D are used. For another embodiment, four ranging pulses 213R followed by four damping pulses 213D are used. For other embodiments, other permutation of ranging pulses 213R and damping pulses 213D may be used. It is to be appreciated that such ranging pulses 213R and damping pulses 213D are ultimately provided, in appropriately modulated and other form, by the transmit driver 210 to the transducer 202 in the intermediate ranging signal 209 and the damping signal 211.

It is to be appreciated that a LUT may be simplified for those embodiments wherein the transmission frequency Tf is fixed or insubstantially varies. For such an embodiment, the LUT may be configured to simply provide a damping ratio Dr to reverberation time relationship. The core logic 214C may be configured to select the damping ratio providing the shortest reverberation time with the greatest damping being utilized, thereby providing for enhanced power savings. For example, when a transducer 202 is operated at a transmission frequency Tf fixed at 53 kHz, to achieve the least reverberation period the core logic 214C may be configured to select a damping ratio Dr between forty-five percent (45%) and sixty-five percent (65%) to achieve a reverberation period RP of 512 μs. For at least one embodiment, the core logic 214C may be configured to select the sixty-five percent (65%) damping ratio Dr.

For at least one embodiment, the core logic 214C may be configured to instruct the pulse generator 212 as to a desired damping ratio Dr to use using any desired degree of precision. For at least one embodiment, six bits of data may be provided by the core logic 214C to the pulse generator 212. In other embodiments, fewer or greater numbers of data bits may be used.

Storage Component 214D

The controller 214 may be communicatively coupled to a storage component 214D, which may also be referred to as a "computer readable storage medium." The storage component 214D may be a single storage device, multiple storage devices, or otherwise. The storage component 214D may be provided locally with the PAS sensor 200 or remotely, such as a data storage service provided by the ECU, and/or otherwise. Storage of data, including but not limited to echo data, reverberation data, LUTs, and other data may be managed by a storage controller (not shown) or similar component. It is to be appreciated such storage

| | LUT 1 | | | | | | | | | | |
|---|---|---|---|---|---|---|---|---|---|---|---|
| Tf | Damping Ratio, Dr (%) | | | | | | | | | | |
| kHz | 30 | 35 | 40 | 45 | 50 | 55 | 60 | 65 | 70 | 75 | 80 |
| 48 | 614.4 | 614.4 | 614.4 | 614.4 | 614.4 | 614.4 | 614.4 | 614.4 | 614.4 | 614.4 | 665.6 |
| 49 | 614.4 | 614.4 | 614.4 | 614.4 | 614.4 | 614.4 | 614.4 | 614.4 | 614.4 | 614.4 | 614.4 |
| 50 | 563.2 | 563.2 | 563.2 | 563.2 | 563.2 | 563.2 | 563.2 | 563.2 | 614.4 | 614.4 | 614.4 |
| 51 | 563.2 | 563.2 | 563.2 | 563.2 | 563.2 | 563.2 | 563.2 | 563.2 | 563.2 | 563.2 | 563.2 |
| 52 | 563.2 | 563.2 | 563.2 | 563.2 | 563.2 | 512 | 512 | 563.2 | 563.2 | 563.2 | 563.2 |
| 53 | 563.2 | 563.2 | 563.2 | 512 | 512 | 512 | 512 | 512 | 563.2 | 563.2 | 563.2 |
| 54 | 563.2 | 563.2 | 512 | 512 | 512 | 512 | 512 | 563.2 | 563.2 | 563.2 | 563.2 |
| 55 | 563.2 | 563.2 | 563.2 | 563.2 | 512 | 563.2 | 563.2 | 563.2 | 563.2 | 563.2 | 563.2 |
| 56 | 563.2 | 563.2 | 563.2 | 563.2 | 563.2 | 563.2 | 563.2 | 563.2 | 563.2 | 614.4 | 614.4 |
| 57 | 563.2 | 563.2 | 563.2 | 563.2 | 563.2 | 563.2 | 563.2 | 614.4 | 614.4 | 614.4 | 614.4 |
| 58 | 563.2 | 563.2 | 563.2 | 563.2 | 563.2 | 614.4 | 614.4 | 614.4 | 614.4 | 614.4 | 614.4 | controller manages the storing of data and may be instantiated in one or more of the storage component 214D, the ECU 300, or otherwise. Any known or later arising storage technologies may be utilized in conjunction with an embodiment of the present disclosure.

Available storage provided by the storage component 214D may be partitioned or otherwise designated by the storage controller as providing for permanent storage and temporary storage. Non-transient data, computer instructions, or other the like may be suitably stored in the storage component 214D. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store either, if not both, transient and non-transient computer instructions and other data.

ECU 300

Figure 3:
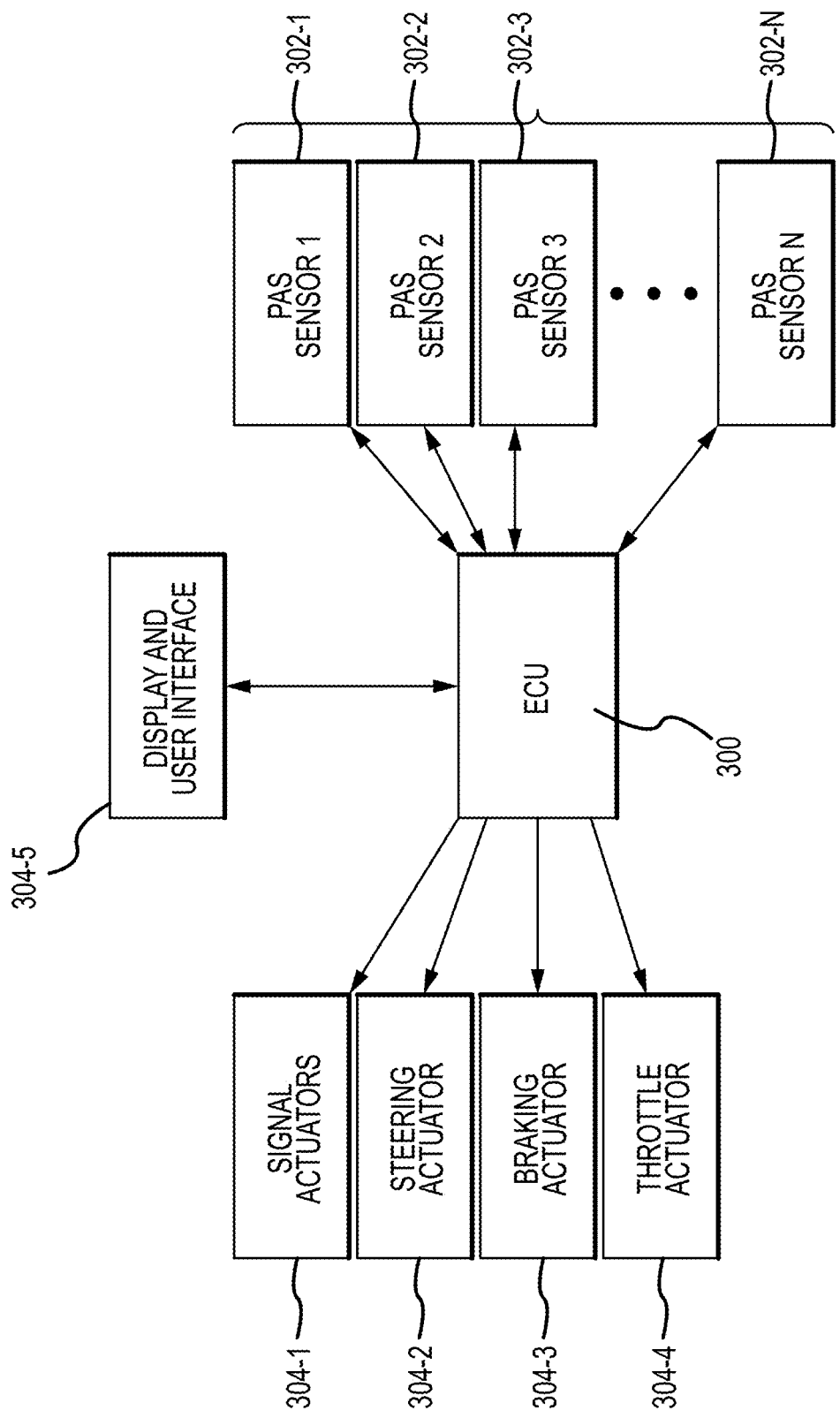
FIG. 3 is schematic diagram of a PAS system incorporating two or more PAS sensors of FIG. 2 and for use in facilitating ultra-short range detection of obstacles and in accordance with at least one embodiment of the present disclosure.
Figure 4:
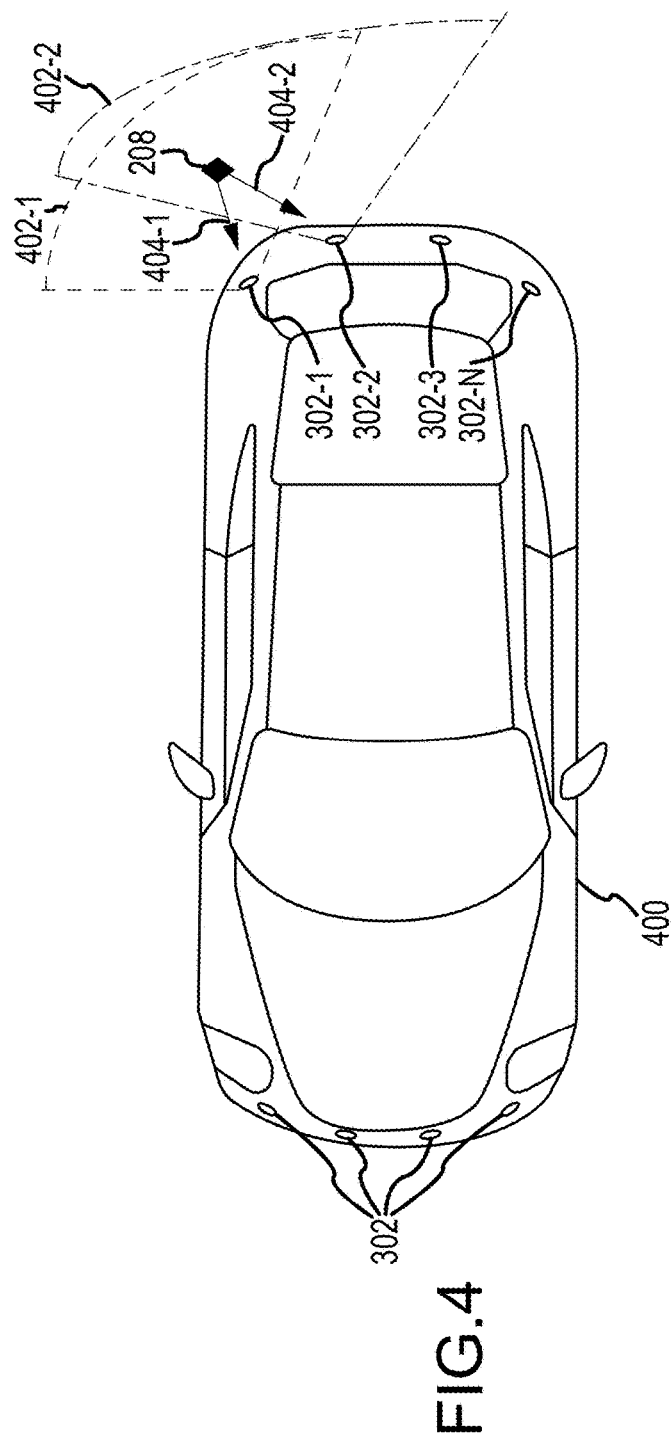
FIG. 4 is an illustration of a vehicle incorporating a PAS system of FIG. 3 and for use in facilitating ultra-short range detection of obstacles and in accordance with at least one embodiment of the present disclosure.

The controller 214 may be coupled to an ECU 300 (as shown in FIG. 3) via an ECU interconnect 222. As shown in FIG. 3, the ECU 300 may be coupled to various PAS sensors 302-1 to 302-N. For at least one embodiment, two or more PAS sensors 302 are used. For at least one embodiment, six (6) PAS sensors 302 are used to detect obstacles relative to each of front side, a driver side, a passenger side and a rear side of a motor vehicle. Non-limiting example of a so configured vehicle 400 having multiple PAS sensors 302 is shown in FIG. 4. It is to be appreciated that each PAS sensor 302 will typically have a unique field of view 402, such as a first field of view 402-1 associated with a first PAS sensor 302-1 and a second field of view 402-2 associated with a second PAS sensor 302-2. For at least one embodiment, two or more field of views overlap, at least in part, such that a first echo 404-1 and a second echo 404-2 may be respectively reflected off an obstacle 208 within the field of view of each of the first PAS sensor 302-1 and the second PAS sensor 302-2.

Figure 5:
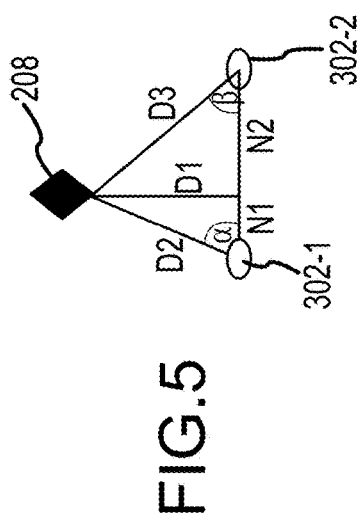
FIG. 5 is diagram illustrating a use of triangulation to determine a minimum distance of an obstacle from a vehicle, by use of a PAS system of FIGS. 3 and 4 and for use in facilitating ultra-short range detection of obstacles and in accordance with at least one embodiment of the present disclosure.

As shown in FIG. 5 and for at least one embodiment of the present disclosure, ultra-short range obstacle detection by the ECU 300 may be facilitated by use of two or more PAS sensors 302-1 and 302-2, which are each configured per an embodiment of the present disclosure to use damping signals, and well known triangulation principles. More specifically, it is to be appreciated that as the relative distance at which echoes are detectable by a given PAS sensor decreases, the minimum distance D1 from a vehicle 400 at which an obstacle 208 may be detected also decreases when such obstacle is detected by two or more PAS sensor and well known triangulation and geometric relationships are used. More specifically, as shown in FIG. 5, various distances are known, such as a distance (N1+N2) between a first PAS sensor 302-1 and a second PAS sensor 302-2. Various angles at which an echo is received (an echo essentially proceeding along a vector from an obstacle to a given sensor) is also determinable. Such as a first angle α at which a first echo 404-1 is received by the first PAS sensor 302-1 and a second angle b at which a second echo 404-2 is received by the second PAS sensor 302-2. Further, distances traveled by a given echo are also determinable using well known time of flight, Doppler and other ranging concepts, such distances may include a second distance D2 and a third distance D3. It is to be appreciated that using such relationships, obstacles within even less than an ultra-short range of a vehicle may be detected. Such detections may occur even though the obstacle is respectively only within ultra-short range distances from one or more of the first PAS sensor 302-1 and/or the second PAS sensor 302-2.

Referring again to FIG. 3, the ECU 300 may also be coupled to and other vehicle components 304 including but not limited to one or more signal actuators 304-1, steering actuators 304-2, braking actuators 304-3, throttle actuators 304-5, display and user interfaces 304-6, and the like. Non-limiting examples of these are described in FIG. 2 and paragraph [0020] of the '783 App. Communications provided between the controller 214 and the ECU 300 may include, but are not limited to, those described in paragraph [0021] of the '783 App. For at least one embodiment of the present disclosure at least two PAS sensors are used to facilitate ultra-short range obstacle detection.

Figure 7:
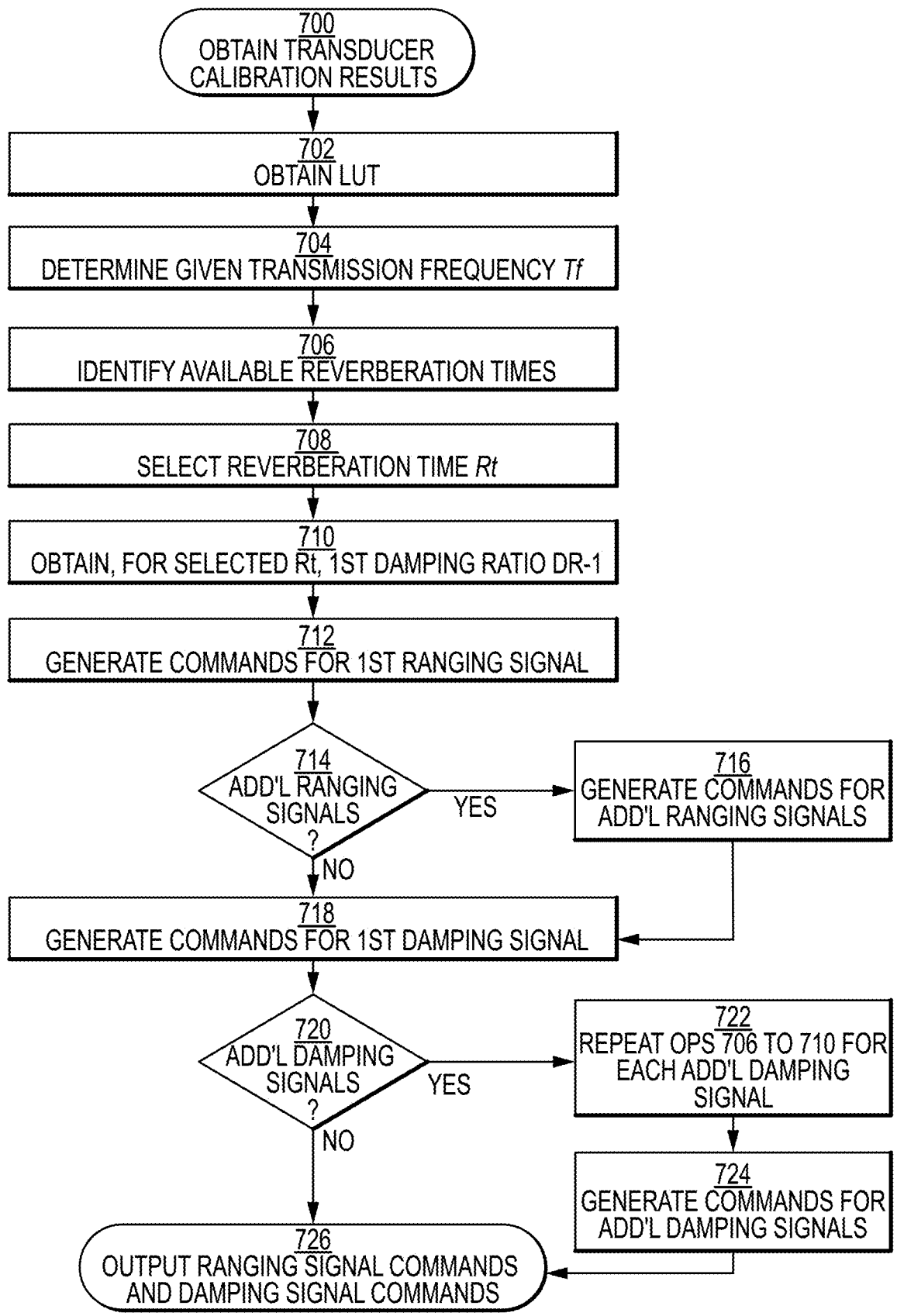
FIG. 7 is flow chart illustrating a process facilitating ultra-short range detection of obstacles and in accordance with at least one embodiment of the present disclosure.

In FIG. 7, a process executed, for example, by the controller 214, for facilitating ultra-short range detection of obstacles is shown.

Per Operation 700, the process may include obtaining of one or more transducer calibration results for a transducer 202. Such results may indicate one or more characteristics of the transducer 202 and include, at least, the transmission frequency Tf. Such calibration results may be accomplished, for example and not be limitation, using the calibration process described in the '783 App. Such calibration results may be performed at any given time, including in a manufacturing and/or initial testing setting, and/or during one or more recalibrations of a transducer, as may occur from time to time and as discussed above. The calibration results may include data identifying one or more characteristics of a transducer.

Per Operation 702, the process may include determining values for and populating a LUT, as described above, for each calibrated transmission frequency Tf. It is to be appreciated that the LUT may be generated during initial PAS sensor testing. The LUT may be stored in the storage component 214D for the calibrated PAS sensor 200.

Per Operation 704, the process may include, during operation of the PAS sensor 200, determining a given transmission frequency Tf for a given transducer. The determination of the current transmission frequency Tf may occur using one or more of the calibration processes used per Operation 700 or using other processes. For at least one embodiment, the determination of the given transmission frequency Tf may be based upon a determined temperature of the transducer.

Per Operation 706, the process may include identifying in the LUT one or more available reverberation times Rt that correspond to the given transmission frequency Tf.

Per Operation 708, the process may include selecting, from the available reverberation times, a desired reverberation time Rt. It is to be appreciated that a selection of an available reverberation time Rt for a given transmission frequency Tf may be based on any one or more desired criteria, such as shortest reverberation time, an average reverberation time, a median reverberation time, longest reverberation time, harmonics associated with a given reverberation time, or otherwise.

Per Operation 710, the process may include obtaining from the LUT and for the reverberation time Rt selected per Operation 708 a first damping ration Dr-1.

Per Operation 712, the process may include generating one or more commands for driving the transmit driver 210 to provide a first intermediate ranging signal 209 for use by the transducer 202 to generate a first ranging signal at a desired transmission frequency Tf, at a desired transmission amplitude Ta, and at a desired transmission phase Tp.

Per Operation 714, the process may include determining whether additional ranging signals are desired. If "yes", the process proceeds to Operation 716. If "no", the process proceeds to Operation 718.

Per Operation 716, the process may include generating one or more commands for ultimately driving the transducer 202 to generate one or more additional ranging signals. Such additional ranging signals may be generated at the given transmission frequency Tf, at a desired transmission amplitude Ta and at a desired transmission phase Tp. The process then proceeds to Operation 718.

Per Operation 718, the process may include generating one or more commands for use in driving the transmit driver 210 to provide a damping signal to the transducer 202. The one or more commands may specify the first damping ratio Dr-1.

Per Operation 720, the process may include determining whether commands are desired for use in driving the transmit driver 210 to provide one or more additional damping signals to the transducer 202. It is to be appreciate that the number of damping signals may or may not correspond to the number of intermediate ranging signals generated by the transmit driver 210. If "yes", the process may proceed with Operation 722. If "no", the process may proceed with Operation 726.

Per Operation 722, the process may include performing again one or more of Operation 706 to 710 for each additional damping signal to be generated. It is to be appreciated that reverberation time Rt for a given damping signal may be the same as or different than for another damping signal. Further, damping ratios used may vary from one damping signal to another damping signal.

Per Operation 724, the process may include generating commands for the desired one or more additional damping signals. The process then proceeds to Operation 726.

Per Operation 726, the process may include outputting the one or more ranging signal commands and the one or more damping signal commands. The commands may be output in a desired sequence including but not limited to: (a) transmit, damp; (b) transmit, transmit, damp; (c) transmit, transmit, damp, damp; (d) transmit, transmit, transmit, transmit, damp, damp; (e) or otherwise.

It is to be appreciated that the operations described above are illustrative only and are not intended herein to occur, for all embodiments of the present disclosure, in the order described, in sequence, by the controller or otherwise. For at least one embodiment, one or more of the operations of FIG. 7 may be performed by the ECU 300. Further it is to be appreciated that a PAS sensor 200 may be configured to perform additional operations based upon the commands output by the controller 214. For example, such additional operations may include generating, by the pulse generator, one or more damping pulse(s) 213D and one or more ranging pulse(s) 213R, generating by the transmit driver 210 one or more intermediate ranging signals 209 and one or more damping signals 211, generating by the transducer one or more ranging signals 204 and applying one or more damping signals 211 such that a given reverberation period is reduced, and otherwise. Further, it is to be appreciated that one or more of the operations may be performed in parallel and operations may be not performed, as provided for any given use of an embodiment of the present disclosure.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A process for facilitating ultra-short range detection of obstacles using a sensor comprising:

selecting, from a plurality of stored calibration results, a reverberation time desired for a transducer;

obtaining, from the plurality of stored calibration results, a damping ratio corresponding to the reverberation time and a transmission frequency;

instructing, using two ranging signal commands, the sensor to drive the transducer to output two consecutive ranging signals at the transmission frequency, at a first transmission amplitude, and at a first transmission phase;

providing two damping signal commands to the sensor independently of the outputting of the two consecutive ranging signals by the transducer;

instructing, based on the two damping signal commands, the transducer to further output, after the two consecutive ranging signals, two consecutive dampened ranging signals at the transmission frequency, at a second transmission amplitude, and at a second transmission phase opposite the first transmission phase, the second transmission amplitude being a product of the damping ratio times the first transmission amplitude; and wherein the outputting of the two consecutive dampened ranging signal results in a dampening of transducer reverberations arising from the output of the two consecutive ranging signals by the transducer.

2. The process of claim 1, further comprising:
obtaining a correlation of at least two characteristics of the transducer;
wherein the at least two characteristics of the transducer are obtained from the plurality of stored calibration results determined during a calibration of the transducer; and
wherein the plurality of stored calibration results are stored in a Look-Up Table (LUT); and
wherein the LUT correlates the transmission frequency for the transducer to the reverberation time and the damping ratio.

3. The process of claim 2, wherein the LUT is obtained from a storage medium populated based on at least two calibrations of the transducer.

4. The process of claim 3, wherein the at least two calibrations of the transducer occur during each of production and during operational use of the transducer.

5. The process of claim 4, wherein each of the at least two calibrations of the transducer establish a relationship between a temperature of the transducer and a transmission frequency for the transducer.

6. The process of claim 1, wherein the damping ratio is between thirty percent (30%) and eighty percent (80%) of the second transmission amplitude.

7. The process of claim 6, wherein the damping signal command results in a providing of the two consecutive dampened ranging signals having a damping phase that is substantially opposite the first transmission phase.

8. The process of claim 6, wherein the damping signal command results in a providing of the two consecutive dampened ranging signals having a damping phase that is one hundred and eighty degrees out of phase with the first transmission phase.

9. The process of claim 2, wherein the at least two characteristics of the transducer include, for a specified transmission frequency, the damping ratio to utilize to obtain the reverberation time.

10. A sensor for detecting obstacles comprising:
a transducer configured to generate a ranging signal and receive an echo signal, the ranging signal having a transmission amplitude, a transmission frequency, and a transmission phase;
a transmit driver, coupled to the transducer, configured to generate a damping signal configured to dampen reverberations in the transducer by further generation of the ranging signal the damping signal including a damping amplitude determined based on a product of the transmission amplitude and a damping ratio, a damping frequency, and a damping phase opposite to the transmission phase;
the transmit driver generating the damping signal independent of an actual generation of the ranging signal by the transducer and in view of at least two characteristics of the transducer obtained from stored calibration results; and
the stored calibration results being stored in a Look-Up Table (LUT) correlating at least the transmission frequency to the damping ratio.

11. The sensor of claim 10 further comprising:
a controller, coupled to the transmit driver, configured to generate a damping signal command;
wherein the damping signal command instructs the transmit driver to generate the damping signal based upon the transmission frequency of the transducer and in view of the stored calibration results.

12. The sensor of claim 11, wherein the damping signal command instructs the transmit driver to generate the damping signal based upon a reverberation time.

13. The sensor of claim 11,
wherein the controller is further configured to generate the damping signal command based upon at least one entry provided in the LUT;
wherein the LUT provides at least one correlation of a reverberation time and the damping ratio;
wherein the controller is further configured to communicate, in the damping signal command, the damping ratio selected from the LUT; and
wherein the damping signal is generated by the transmit driver based upon the damping ratio.

14. The sensor of claim 11, wherein the controller is further configured to generate the damping signal command based upon the transmission frequency of the transducer.

15. The sensor of claim 14,
wherein the controller is further configured to determine the transmission frequency based upon a calibration of the transducer;
wherein the calibration of the transducer generates a correlation of a temperature with each transmission frequency;
wherein the controller is thermally coupled to the transducer by a first input terminal; and
wherein the transmission frequency of the transducer is determined based upon a temperature of the first input terminal.

16. The sensor of claim 11, wherein the damping amplitude is between forty-five percent (45%) and sixty-five percent (65%) of the transmission amplitude.

17. The sensor of claim 16, wherein the damping frequency is within twenty percent (20%) of the transmission frequency.

18. A system, for determining distances of an article from an obstacle, comprising:
a sensor, provided with an article, configured to:
detect an obstacle at a first ultra-short range distance from the article by damping reverberations arising in a transducer after a transmission of a ranging signal from the article and towards the obstacle;
receive an echo signal reflected off the obstacle;
output a modified first echo signal; and
wherein the ranging signal is characterized by a transmission amplitude, a transmission frequency, and a transmission phase;
wherein the sensor further comprises:
a transmit driver, coupled to the transducer, configured to:
independently determine, before generation of the ranging signal by the transducer, a damping signal to be used using at least two characteristics of the transducer obtained from calibration results stored in a Look-Up Table (LUT) correlating the transmission frequency of the transducer to a damping ratio; and
generate, after transmission of the ranging signal, the damping signal to dampen the reverberations arising in the transducer after the transmission of the ranging signal;
wherein the damping signal is characterized by a damping amplitude, a damping frequency, and a damping phase opposite to the transmission phase.

19. The system of claim 18,
wherein the damping amplitude is a product of the transmission amplitude multiplied by the damping ratio; and
wherein the damping ratio is between forty-five percent (45%) and sixty-five percent (65%) of the transmission amplitude.

20. The system of claim 18, wherein the damping frequency is within twenty percent (20%) of the transmission frequency.

21. The system of claim 18, wherein the sensor is a first sensor, the ranging signal is a first ranging signal, the transducer is a first transducer,
the system further comprising:
a second sensor configured to:
detect the obstacle at a second ultra-short range distance from the article by damping second reverberations arising in a second transducer after transmission of a second ranging signal from the article and towards the obstacle;
receive a second echo reflected off the obstacle; and
output a modified second echo signal; and
an electronic control unit configured to:
receive the modified first echo signal and the modified second echo signal; and
determine a minimum distance of the article from the obstacle by use of triangulation of the modified first echo signal and the modified second echo signal.

* * * * *